(12) United States Patent
Leggieri et al.

(10) Patent No.: US 11,871,504 B2
(45) Date of Patent: Jan. 9, 2024

(54) ELECTRONIC SYSTEM EQUIPPED WITH A HEAT-TRANSPORT FLUID COOLING CIRCUIT

(71) Applicant: THALES, Courbevoie (FR)

(72) Inventors: Alberto Leggieri, Velizy-Villacoublay (FR); François Legrand, Velizy-Villacoublay (FR); Rodolphe Marchesin, Velizy-Villacoublay (FR); Andrea Allio, Turin (IT); Rosa Difonzo, Turin (IT); Laura Savoldi, Turin (IT)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/954,136

(22) Filed: Sep. 27, 2022

(65) Prior Publication Data

US 2023/0120648 A1 Apr. 20, 2023

(51) Int. Cl.
*H01J 23/033* (2006.01)
*H05H 13/00* (2006.01)
*H02J 50/12* (2016.01)
*H05H 7/22* (2006.01)

(52) U.S. Cl.
CPC ......... *H05H 13/005* (2013.01); *H01J 23/033* (2013.01); *H02J 50/12* (2016.02); *H05H 7/22* (2013.01)

(58) Field of Classification Search
CPC .... H01J 7/24; H01J 17/28; H01J 19/74; H01J 23/005; H01J 23/033
USPC .......................................................... 313/24
See application file for complete search history.

(56) References Cited

U.S. PATENT DOCUMENTS 3,259,790 A 7/1966 Goldfinger
2012/0263820 A1* 10/2012 Thoemmes ......... B29C 45/7207
425/446

FOREIGN PATENT DOCUMENTS

CN 114142660 A * 3/2022
DE 102012213059 A1 * 1/2014 ............. B23P 15/26
JP H6-267441 A 9/1994

* cited by examiner

*Primary Examiner* — Christopher M Raabe
(74) *Attorney, Agent, or Firm* — BakerHostetler

(57) ABSTRACT

An electronic system includes an external jacket; a wall of an internal cavity that is to be cooled; at least one fixed connection fixing the external wall of the internal cavity that is to be cooled to the external jacket; a heat-transport fluid cooling circuit comprising grooves on the external surface of the wall of the internal cavity and a sleeve comprising a flexible portion positioned flush with the external surface of the external wall of the internal cavity, thereby forming mini-canals with said grooves; a radial extension of the wall of the internal cavity creating connecting points intended to hold the sleeve in place; and a space between the external jacket and the sleeve at the flexible portion of the sleeve.

16 Claims, 18 Drawing Sheets

ELECTRONIC SYSTEM EQUIPPED WITH A HEAT-TRANSPORT FLUID COOLING CIRCUIT

CROSS-REFERENCE TO RELATED APPLICATION

This application claims priority to foreign French patent application No. FR 2110917, filed on Oct. 14, 2021, the disclosure of which is incorporated by reference in its entirety.

FIELD OF THE INVENTION

The invention relates to an electronic system equipped with a heat-transport fluid cooling circuit.

The technical field to which the present invention applies is electronic device technology. This invention meets the needs of high-performance cooling systems for elements subjected to high heat conditions, and notably for cooling the resonant cavities of a gyrotron.

BACKGROUND

In order to limit the thermal expansion of elements of electronic devices, heated to critical levels, such as the resonant cavities of vacuum tubes, alloys of low thermal expansion are used for making such elements. The devices most greatly affected are gyrotrons and cyclotron autoresonance masers (CARMs) which operate using millimeter waves at power levels of the order of a megawatt.

This entails the management of thermal loads of several kW/cm2. The distance between the heated wall and the stream of heat-transport cooling fluid plays a critical part in improving the cooling: the smaller this distance, the greater the extent to which the temperature of the hot spot is decreased. Conversely, the minimum permissible thickness is the thickness that provides vacuumtightness tv. The most effective existing cooling solutions are based on Raschig rings, or RR for short, and Porous media Heat exchange, or PH for short.

These technologies are limited by the critical compromise between thermal stress and radial expansion, and by the azimuthal inhomogeneity of the temperature. The flexibility of the porous media forces the designer to reach a compromise between the removal of heat and the mechanical stability: if the element that is to be cooled has a wall that is too thin, its thermal expansion may be too great and its mechanical stability is seriously adversely affected. If the wall is too thick, the exchange of heat is limited by the presence of a thick wall between the heated surface and the stream of heat-transport fluid: this aspect limits the heat transfer.

SUMMARY OF THE INVENTION

The present invention is aimed at developing a high-performance cooling system for elements subjected to severe thermal conditions.

The invention proposed meets the requirements for highly effective cooling of real electronic and electrical subsystems, systems and devices which demand ever increasing cooling capacities in order to minimize thermomechanical deformation. Such deformations of the internal surface of the object being cooled lead to a variation in the operating frequency and to a potential reduction in the output of the electronic device.

The critical subassemblies of electronic devices require effective cooling to be applied to the anodes (tubes with grids), to the collectors (klystrons and TWTs) and to the cavities (gyrotrons and CARMs). The best-performing true heat exchangers currently operate using a fluid, which is often water.

The purpose of the heat-transport fluid is to reduce the temperature of the heated surface. The heat heats the fluid and is removed by the flowing of this fluid through the cooling circuit. This can be achieved by increasing the coefficient of heat transfer between the heated element and the heat-transport fluid while at the same time keeping the heat-transport fluid as close as possible to the heated surface.

It is notably known practice to use mini-canals to partially alleviate these disadvantages, although these produce significant mechanical stresses.

The known cooling solutions using mini-canals are affected by a number of disadvantages which cause significant mechanical problems in terms of the mechanical stresses induced in the cavity, which are far in excess of the accepted limits, above which the materials are liable to experience plastic deformation and cracking.

These solutions often employ two or more elements, generally made from different materials: an interior element surrounded by an exterior element. The actual mini-canals circuits proposed in the literature, if produced, assume that the mini-canals are implemented as canals in a straight line in a single block of material or that they are drilled into one of the two distinct blocks.

In the case of a single block of material, as illustrated schematically in FIG. 1, it is known practice to employ a network of rectilinear mini-canals 1 produced in a single block 2. This block 2 is often made of a hollow axisymmetrical structure formed of hollow cylinders having two different outside diameters for three different zones along the axial coordinate: a smaller outside diameter for the lateral zones and a larger diameter for a central zone containing the mini-canals 1.

In this configuration, a certain distance is required between a mini-canal 1 and the heated wall that is to be cooled, because no curving of the path of the canal along the axial coordinate is permitted. This distance may result in a considerable thermal resistance.

Because the operations of milling and drilling canals involve rectilinear machining paths, the mini-canals 1 cannot be placed at a constant (along their length) distance from the heated wall if the element that is to be cooled has a non-cylindrical internal shape (for example, gyrotron cavities are conical), because a straight mini-canal on an element that is inclined lies at a different distance from the cavity at various points along the mini-canal. As a result, non-uniform cooling occurs.

The distance between the heated wall and the stream of heat-transport fluid is limited by the presence of intermediary material needed for the creation of the elements and this distance cannot be minimized right down to the thickness limited by the vacuumtightness tv.

In the case of multiple blocks, other solutions employed by assembling separate elements by brazing or bonding these blocks together are known. Often only two blocks are needed. The interior block generally has the surface that is heated, and the exterior block surrounds the interior block. The use of two blocks is liable to involve the following disadvantages.

The imperfect contact between the blocks 3, 4, as illustrated in FIG. 2, acts as a thermal impedance. If the braze or adhesive material 5 is located in a limited region, for example through the use of circular runs of braze or adhesive material, the remaining contact between the two (or more) blocks 3, 4 results in an imperfect contact, which therefore leads to an unavoidable contact thermal resistance.

The presence of the braze material 6, interposed between these blocks 3, 4, as illustrated in FIG. 3, displays the following two disadvantages. If the alloy is present over the entire plane beneath a mini-canal 1, edge effects occur at the interface and limit the extraction of heat, acting like a thermal resistance. Further, the presence of braze material 6 between the blocks 3, 4 introduces the manufacturing risk of obstructing certain mini-canals 1 which risk, in order to be lessened, encourages towards limiting the number of mini-canals 1.

In both of these two instances of brazing, these circuits need to be implemented in closed regions of material, notably by drilling a single element or by milling the external surface of a coaxial internal element that is to be inserted inside a coaxial external element that closes the mini-canals. It is therefore not possible to produce mini-canals 1 that have complex shapes such as curves, because of the machining limitations. Additive manufacturing techniques could overcome the problem of the curved profile but, in the prior art, materials deposited using additive manufacturing techniques are unable to withstand the particular stress of thermal expansion with reference to the desired design tolerances placed on the dimensions once the element in question is heated. Otherwise, they may exhibit significant thermal expansions or may be unable to meet the roughness and electrical conductivity requirements. Therefore, under high-temperature conditions, this additive manufacturing technology cannot be used.

In any case, the structure 4 surrounding the mini-canals 1 exerts a mechanical stress that opposes the thermal expansion of the internal block, leading to mechanical stresses.

The minimal distance between a mini-canal and the wall that is directly heated may limit the mechanical stability of the element that is to be cooled: in order to reduce the thermal resistance, the cooling stream needs to circulate as close as possible to the heated wall. In that case, the small thickness of the material between the mini-canal and the wall that is to be cooled is unable to provide the necessary stiffness and undesirable deformations may occur. As the mini-canal gradually nears the wall that is to be cooled, the block of material decreases in size, exposing the entire system to a lack of mechanical stiffness and of stability. A minimal distance that ensures mechanical stability $t_M$ needs to be interposed between the heated and cooled walls. Accordingly, the thickness limited by the vacuumtightness tv cannot be achieved and the heat transfer is reduced.

The mini-canals pass along the entire length of the cylindrical object that is to be cooled, leading to an inhomogeneity in the axial temperature profile, in the event of thermal load, which exhibits a very pronounced spike in their axial distribution. This leads to mechanical stresses in the structure as a result of the steep axial thermal gradient.

The rectilinear profile of a mini-canal leads to a constant distance between the fluid stream and the heated surface. If a thermal load that is not uniform along the mini-canals is present, it is not possible to minimize the temperature spike on the heated surface.

FIG. 4 depicts a prior art for mini-canals 1 formed by grooves 7 on the external surface of the wall 8 of an internal cavity 9 and of a sleeve 10.

FIG. 5 and FIG. 6 also depict other views of the embodiment of FIG. 4.

In all cases, the structure 10 which is connected to the ends of the element 9 that is to be cooled exerts mechanical stress in an axial direction that opposes the thermal expansion of the internal element 9, giving rise to mechanical stresses.

In all cases, the single heat-transport fluid inlet, located in a certain position, gives the heat-transport fluid a high velocity in the vicinity of the inlet itself. The velocity of the heat-transport fluid is lower further away from the inlet. As a result, the extraction of heat far from the heat-transport fluid inlet is reduced and the temperature of the element that is to be cooled is azimuthally inhomogeneous.

It is an object of the invention to alleviate the abovementioned problems.

The invention proposed seeks to improve the cooling and the thermomechanical robustness of the element to which it can be applied. For example, this solution can be applied to the cavities, to the collectors and to any element that is to be cooled.

Any geometric layout of the element that is to be cooled may benefit from the proposed invention: cylindrical, square or conical geometries as well as frustoconical geometries may form the object to which the cooling circuit with routed mini-canals can be applied.

This solution can be applied equally to electron tubes or to particle accelerators both in the solid state and with passive elements. The device to which the invention is particularly well applicable is the gyrotron.

One aspect of the invention proposes an electronic system comprising:
  an external jacket;
  a wall of an internal cavity that is to be cooled;
  at least one fixed connection fixing the external wall of the internal cavity that is to be cooled to the external jacket;
  a heat-transport fluid cooling circuit comprising grooves on the external surface of the wall of the internal cavity and a sleeve comprising a flexible portion positioned flush with the external surface of the external wall of the internal cavity, thereby forming mini-canals with said grooves, having a non-zero longitudinal component, the flexible portion comprising an end first part of a first thickness greater than a second thickness of a contiguous second part of the flexible portion, the second part being contiguous with a third part of the sleeve which has a third thickness greater than the first and second thicknesses, and in contact with a jacket positioned on the outside of the external jacket;
  at least one radial extension of the wall of the internal cavity creating connecting points intended to hold the sleeve in place; and
  a space between the external wall of the internal cavity and the sleeve at the flexible portion of the sleeve.

According to one embodiment, the first thickness is at least twice as great as the second thickness, and the third thickness is at least twice as great as the second thickness.

In one embodiment, the system comprises at least three connecting points for connecting, in terms of longitudinal translation, the sleeve and the wall of the internal cavity.

According to one embodiment, a connecting point comprises a brazed and/or welded and/or heat-shrunk connection.

In one embodiment, the system comprises an extendable bellows in the external jacket.

According to one embodiment, the system comprises at least one inlet of the cooling circuit in the external jacket opening onto the space between the external jacket and the sleeve, so that the path of a heat-transport fluid from said inlet to the mini-canals is maximized, so as to introduce homogeneity into the axial velocity of the fluid in said space.

In one embodiment, a mini-canal is rectilinear or curved.

According to one embodiment, a mini-canal has a circular, semi-circular or rectangular cross section.

In one embodiment, the system comprises a heat-transport fluid distributor comprising the jacket positioned on the outside of the external jacket to form a heat-transport fluid chamber positioned above a number of inlets into the external jacket opening onto the space between the external jacket and the sleeve.

According to one embodiment, said inlets of the heat-transport fluid distributor are arranged in a circle on the external jacket.

In one embodiment, the inlets are of rectangular and/or circular and/or square and/or semi-circular shape.

According to one embodiment, a groove forming a mini-canal contains a porous medium.

According to one embodiment, the external jacket comprises layers of ceramic-based or metal-based porous material (for example a tungsten or rhenium foam or Ultramet®).

In one embodiment, the wall of the internal cavity contains copper mixed with ceramic alumina particles, notably Glidcop®.

According to one embodiment, the system is a resonant cavity, an electron vacuum tube or a gyrotron.

BRIEF DESCRIPTION OF THE DRAWINGS

The invention will be better understood from studying a number of embodiments described by way of entirely non-limiting examples and illustrated by the attached drawings in which the figures.

Across all of the figures, the elements that have identical references are similar.

DETAILED DESCRIPTION

Figure 1:
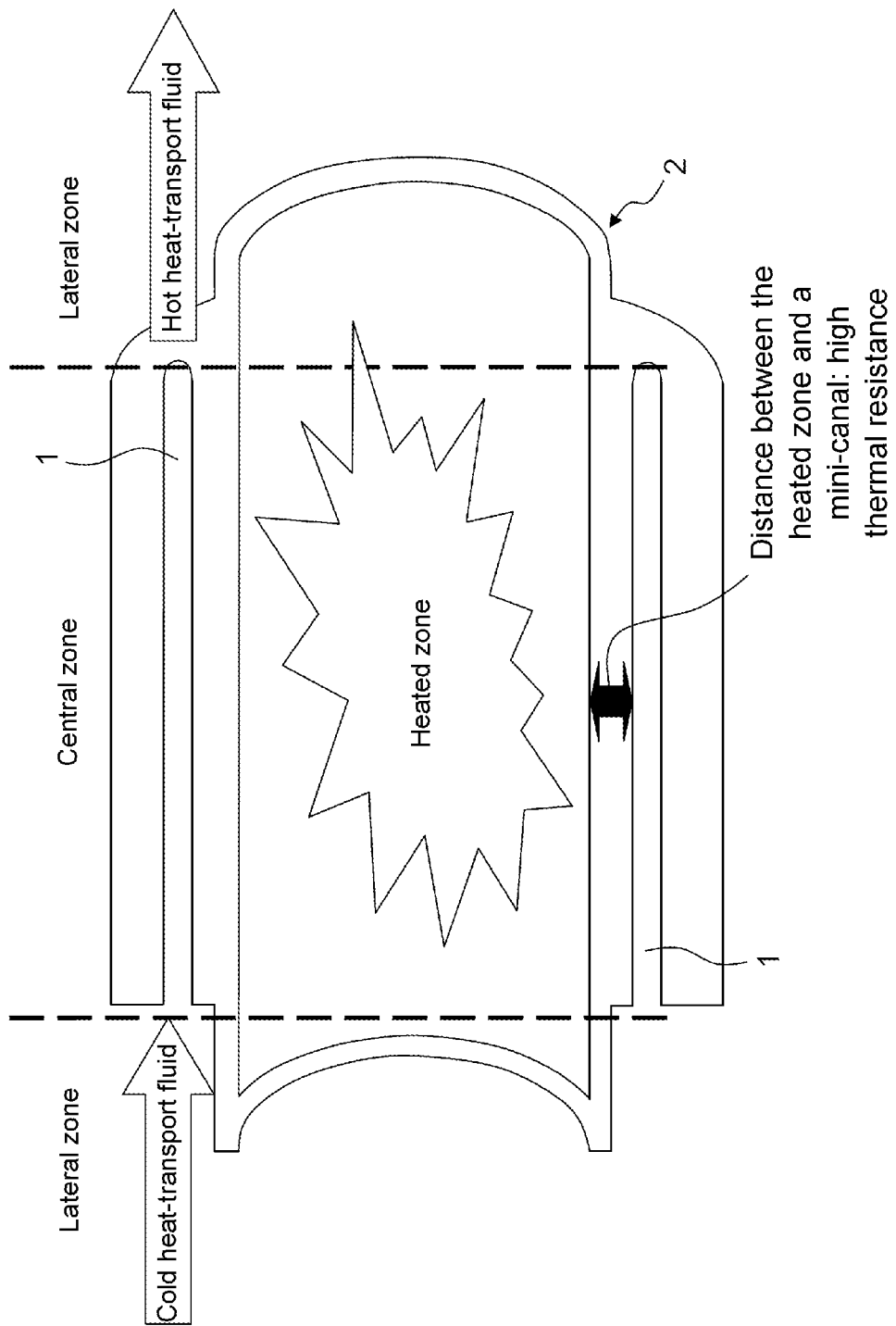
FIG. 1 schematically illustrates an electronic system cooled by mini-canals from the prior art.
Figure 2:
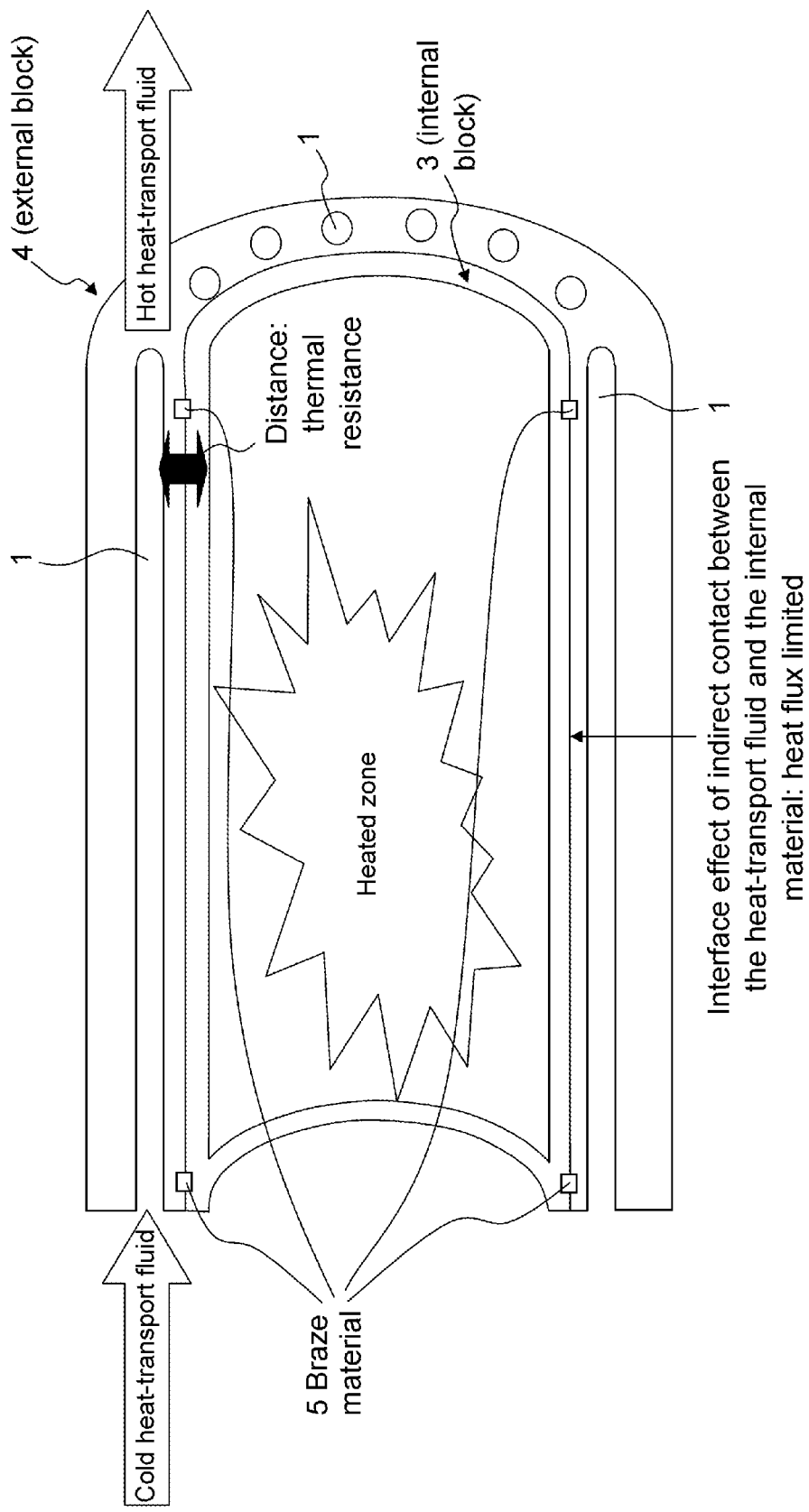
FIG. 2 schematically illustrates an electronic system cooled by mini-canals from the prior art.
Figure 3:
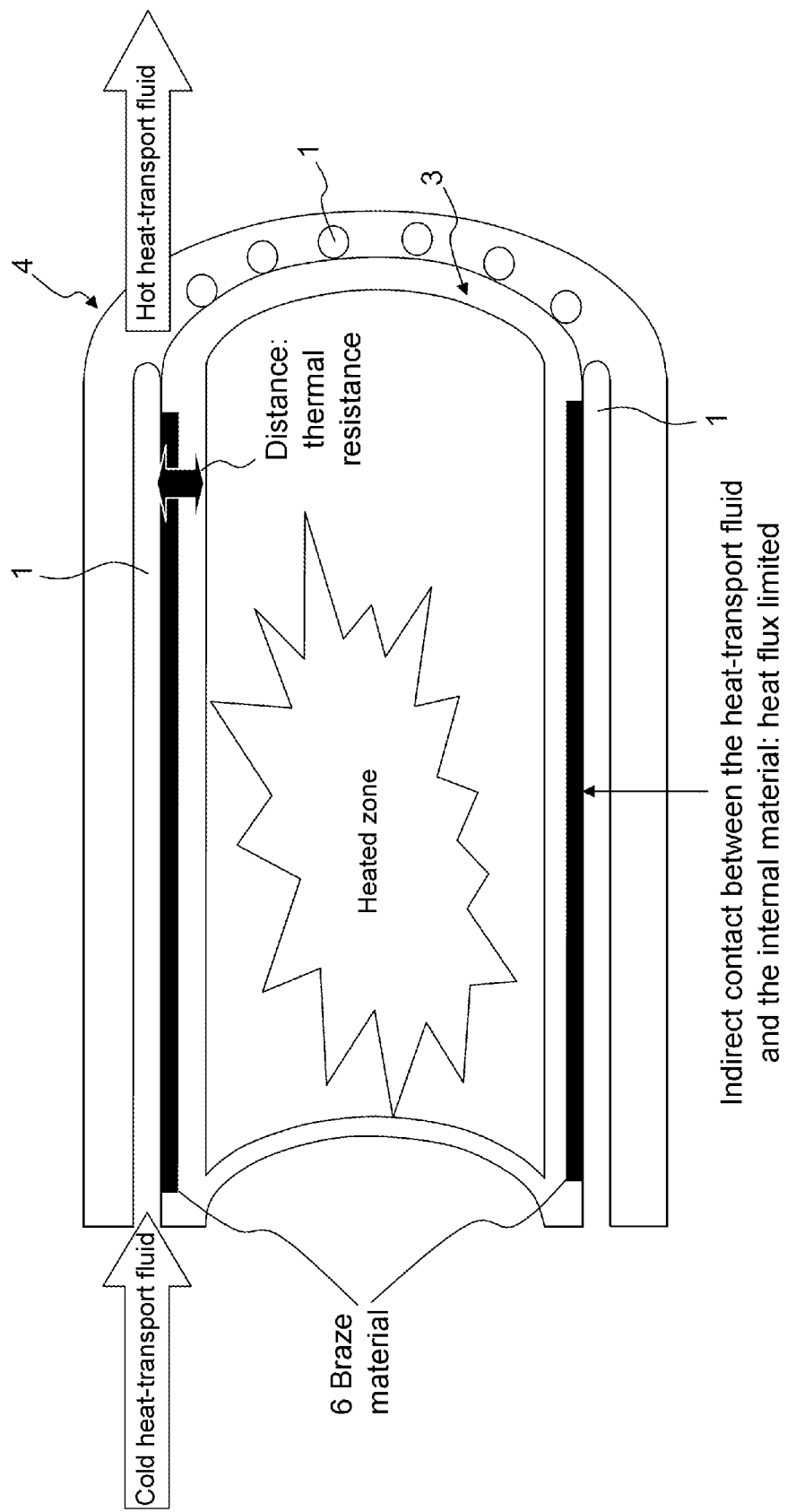
FIG. 3 schematically illustrates an electronic system cooled by mini-canals from the prior art.
Figure 4:
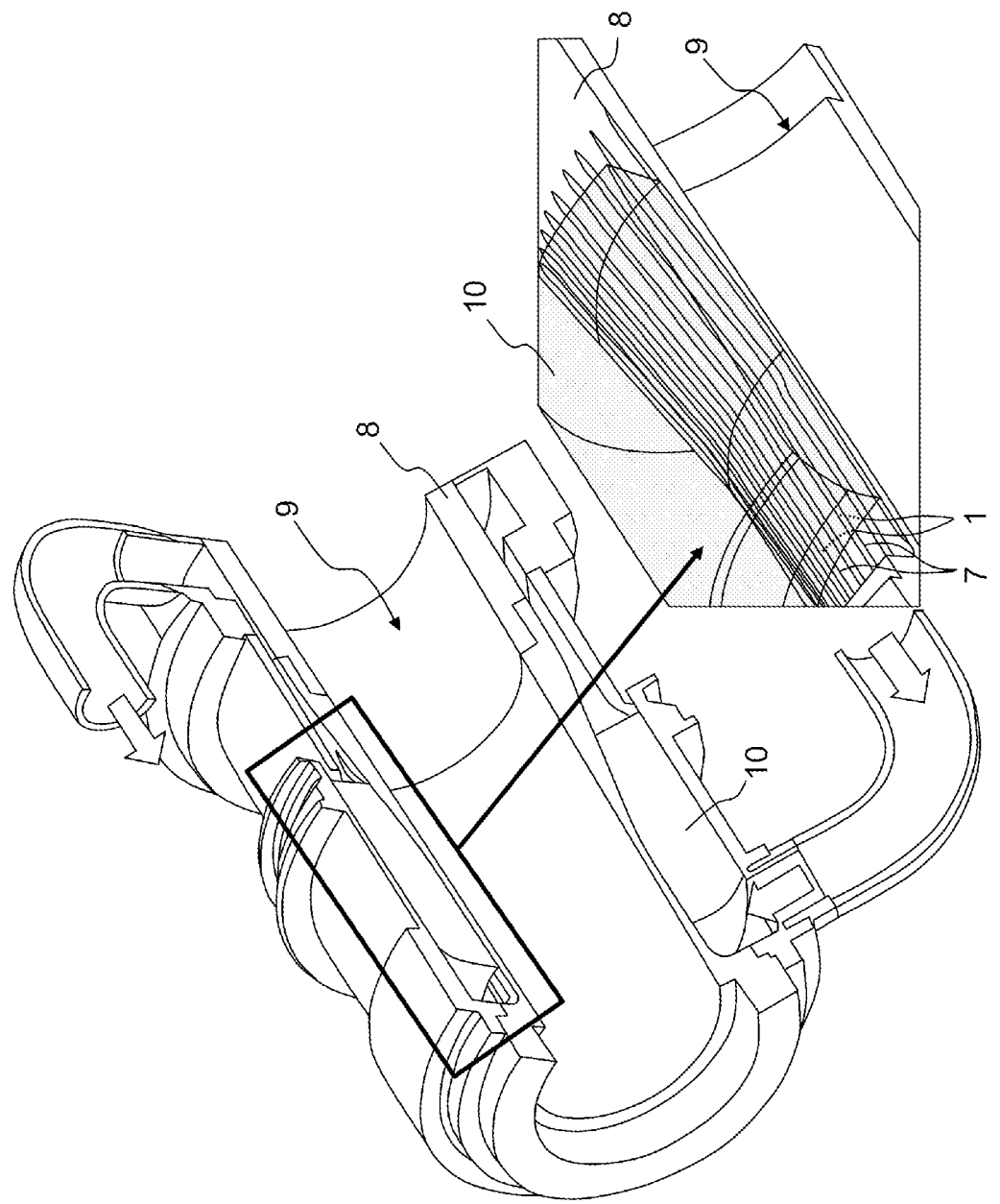
FIG. 4 schematically illustrates an electronic system with mini-canals formed by grooves on the external surface of the wall of an internal cavity and of a sleeve, according to the prior art.
Figure 5:
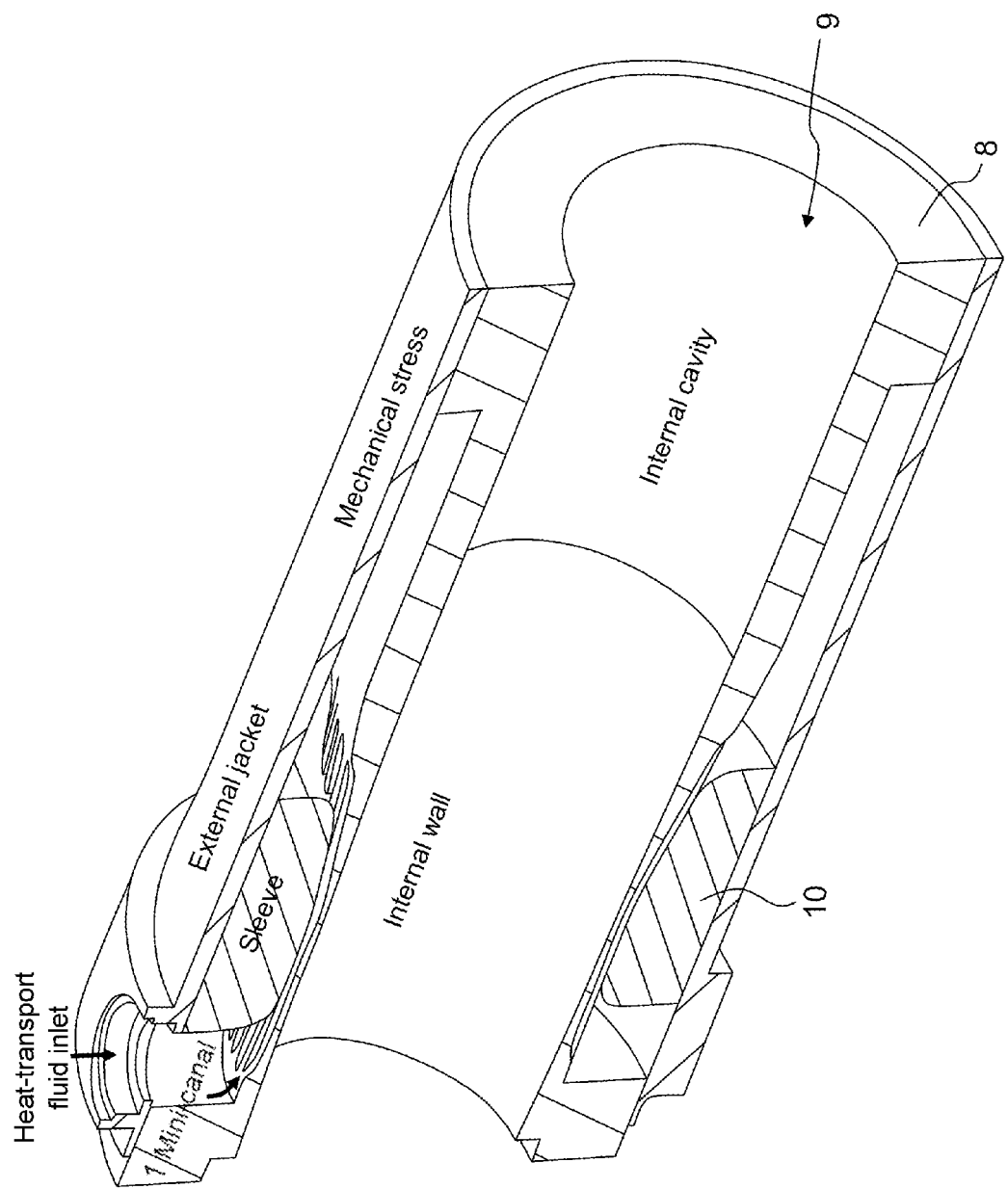
FIG. 5 schematically illustrates another view of the system of FIG. 4, according to the prior art.
Figure 6:
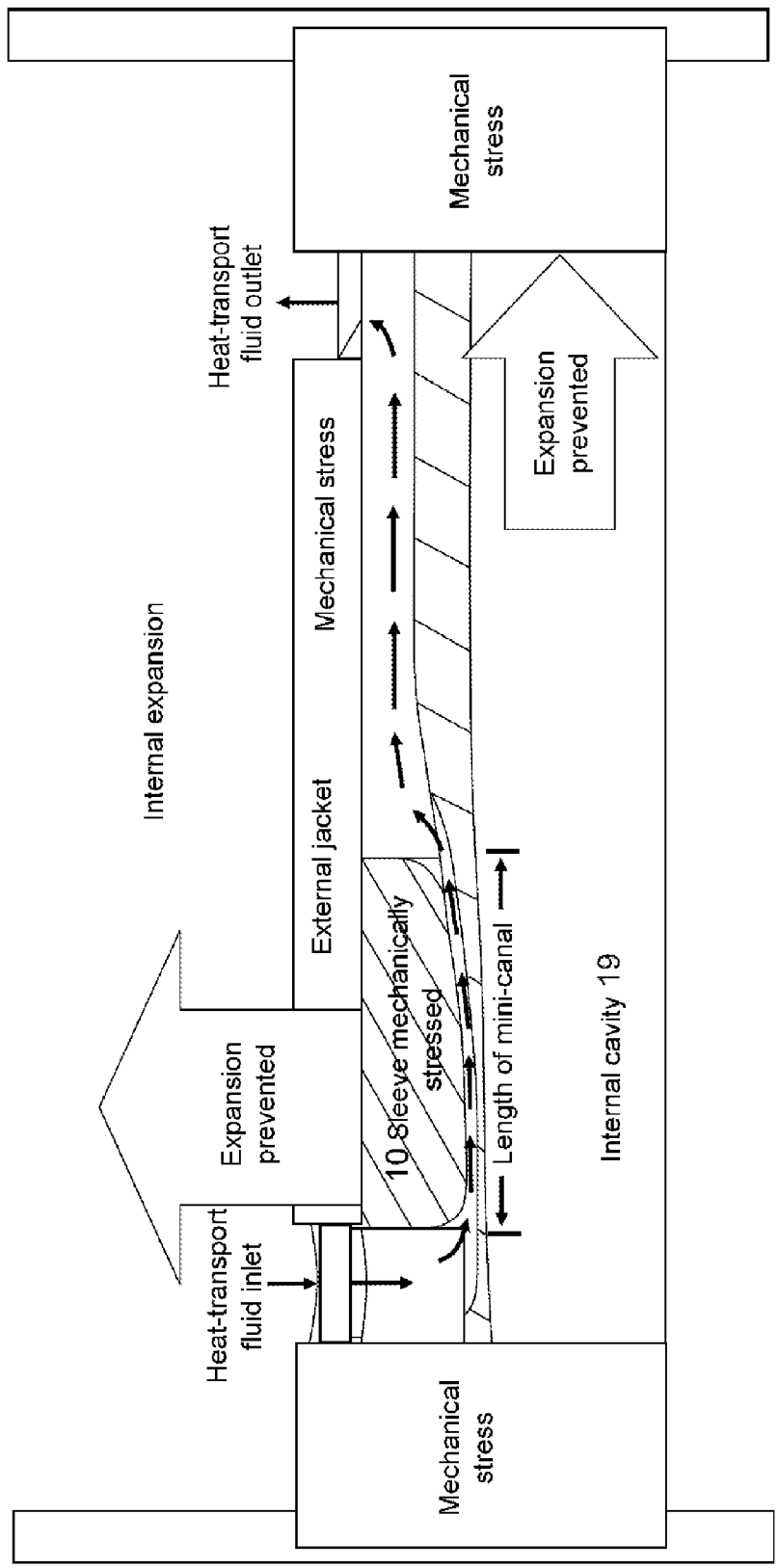
FIG. 6 schematically illustrates another view of the system of FIG. 4, according to the prior art.
Figure 7:
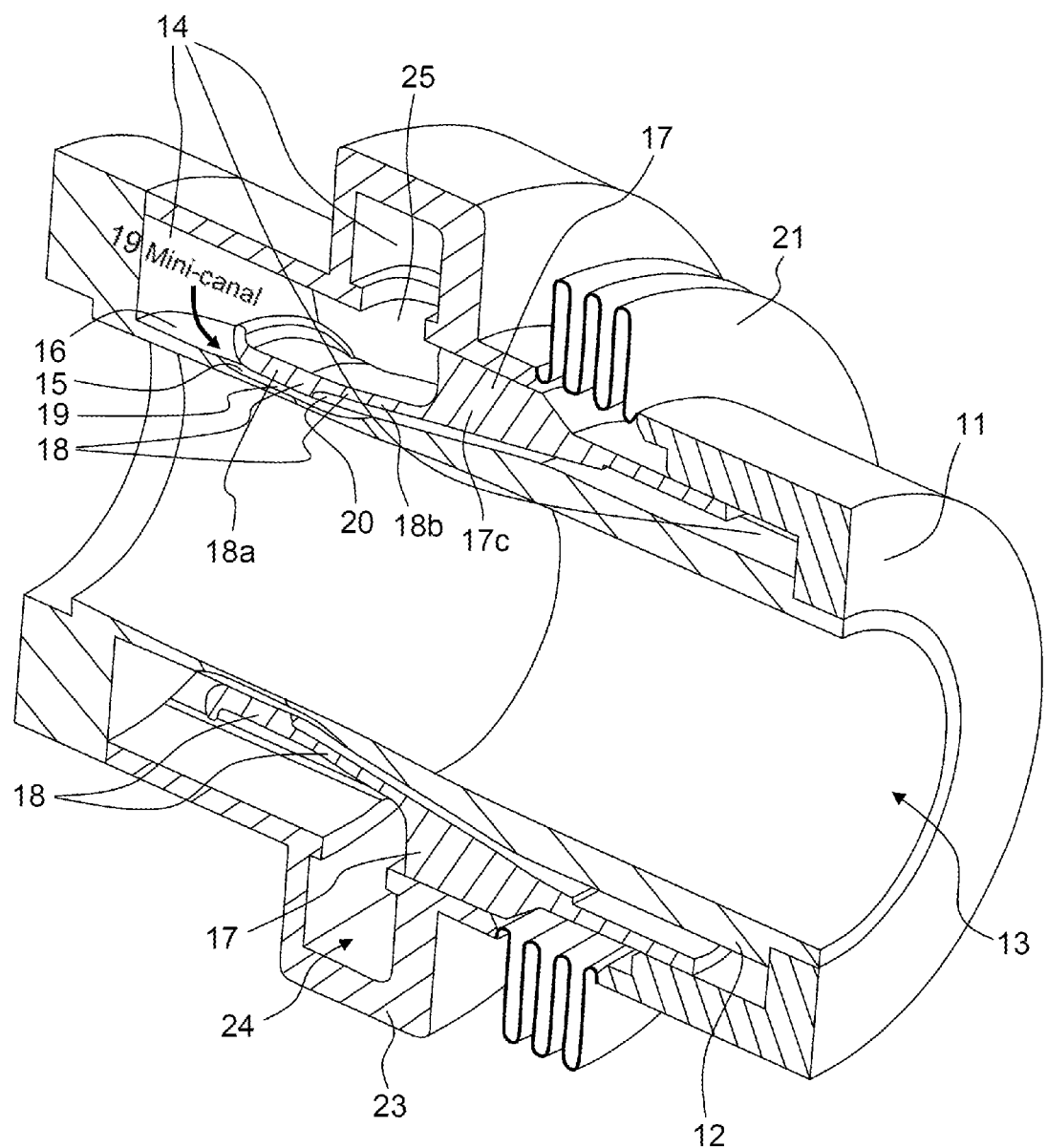
FIG. 7 schematically illustrates an electronic system with mini-canals formed by grooves on the external surface of the wall of an internal cavity and of a sleeve, according to one aspect of the invention.
Figure 8:
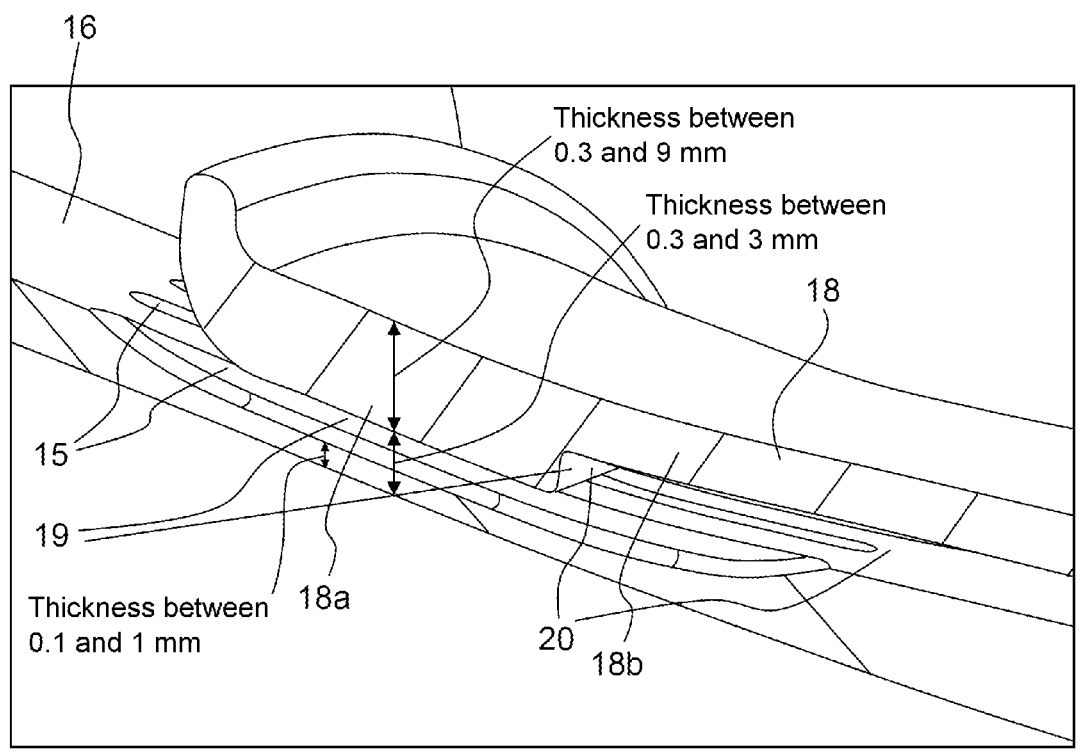
FIG. 8 schematically illustrates another view of the system of FIG. 7, according to one aspect of the invention.
Figure 9:
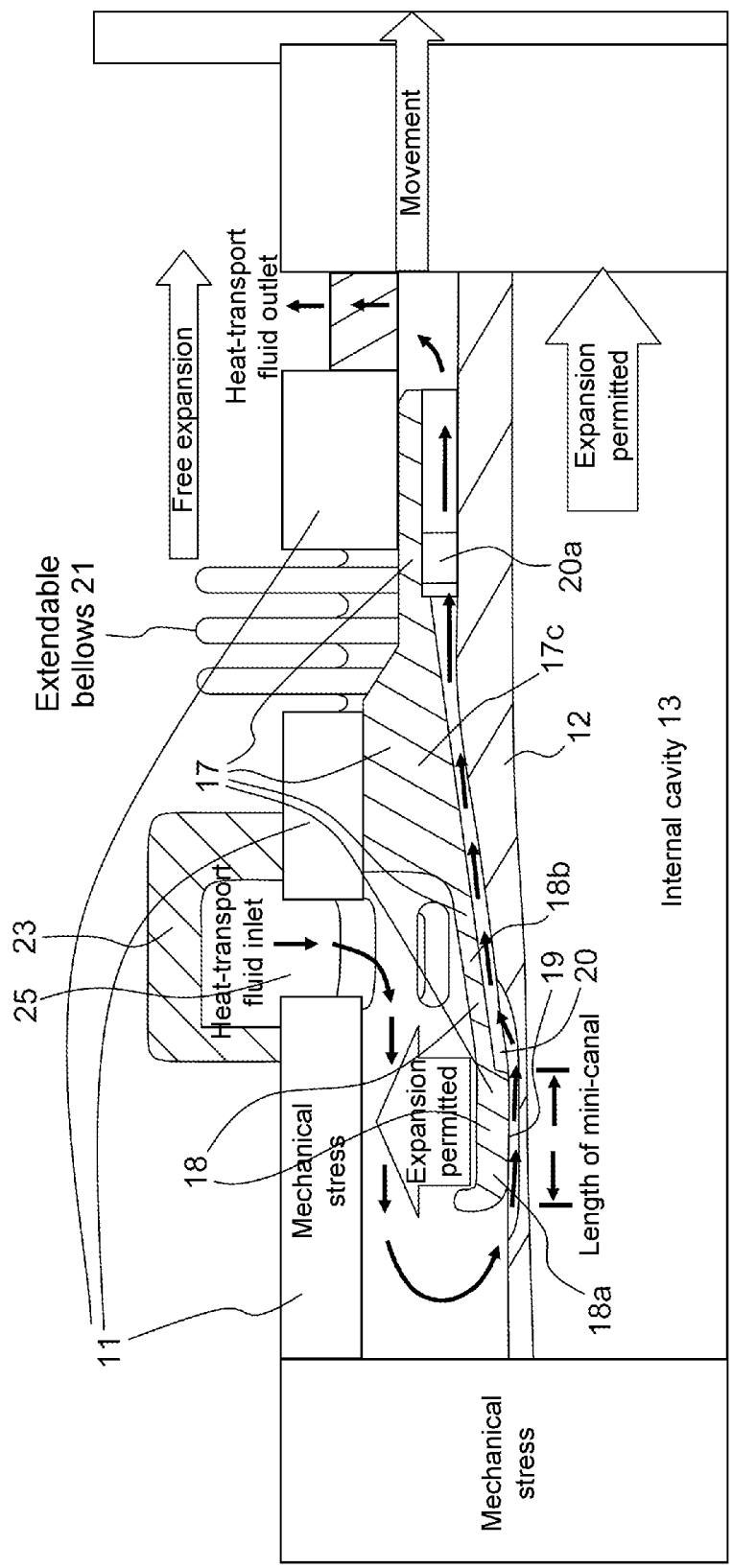
FIG. 9 schematically illustrates another view of the system of FIG. 7, according to one aspect of the invention.

The electronic system proposed, as depicted in FIG. 7, FIG. 8 and FIG. 9, comprises:
an external jacket 11;
a wall 12 of an internal cavity 13 that is to be cooled;
at least one fixed connection 5 fixing the wall 12 of the internal cavity 13 that is to be cooled to the external jacket 11;
a heat-transport fluid cooling circuit 14 comprising grooves 15 on the external surface 16 of the external wall 12 of the internal cavity 13 and a sleeve 17 comprising a flexible portion 18 positioned flush with the external surface 16 of the external wall 12 of the internal cavity 13, thereby forming mini-canals 19 with said grooves 15, having a non-zero longitudinal component, the flexible portion 18 comprising an end first part 18a of a first thickness greater than a second thickness of a contiguous second part of the flexible portion 18, the second part 18b being contiguous with a third part 17c of the sleeve 17 which has a third thickness greater than the first and second thicknesses, and in contact with a jacket 23 positioned on the outside of the external jacket 11;
at least one radial extension of the wall 12 of the internal cavity 13 creating connecting points intended to hold the sleeve 17 in place; and
a space 20 between the external wall 12 of the internal cavity 13 and the sleeve 17 at the flexible portion 18 of the sleeve 17.

A sleeve is a force-fitted cylindrical component.

As a preference, the first thickness is at least twice as great as the second thickness, and the third thickness is at least twice as great as the second thickness.

The electronic system comprises at least three connecting points or one continuous connection for connecting, in terms of longitudinal translation, the sleeve 17 and the wall 12 of the internal cavity 13. A connecting point 20a or a continuous connection may comprise a brazed and/or welded and/or heat-shrunk connection. For example, the radial extensions may be produced using pins, for example 4 pins 20a, or with a continuous radial extension containing openings.

The electronic system may comprise an extendable bellows 21 in the external jacket 11. The heat-transport fluid may comprise water, air or oil.

The cooling circuit with mini-canals 19 comprises a network of small-sized mini-canals 19, typically of a diameter of between 0.2 mm and 2 mm if they are circular, or of a cross-sectional area of between $\pi/100$ mm2 and $\pi$ mm2, through which there circulates a heat-transport fluid used for cooling the internal cavity 13. The distance between the stream of heat-transport fluid and the wall of the internal cavity can be minimized down to the minimal distance that ensures vacuumtightness tv.

The short length of a mini-canal 19 is due to the inlet to the canal, which needs to be situated in correspondence with the thermal load spike. This allows the very high-velocity inlet to the mini-canals 19 to be exploited, resulting in a heat-transfer coefficient that is higher than in the rest of the mini-canals, corresponding to the remainder of the path of the heat-transport fluid, exactly in the zone of peak need (the zone in which the maximum thermal load is present). The result of this design is a temperature profile that is flatter or constant along the axial coordinate because the jet of cold fluid is directed toward the maximum of the thermal load. As a result, the better cooling allows lesser thermal expansion of the materials imparting low expansion forces to the sleeve 17 which is therefore subjected to lower mechanical stress. Another advantage of a mini-canal that is short is the significant reduction in the pressure drops distributed over the length of the mini-canals, and therefore a reduction in the overall total pressure drops in the circuit, notably halving the pressure drops in comparison with the prior art (2-3 bar in place of 5-6 bar for fluid flowrates of around 45-55 l/min).

These mini-canals are produced between two different elements: possibly made of two different materials: the internal cavity 13, with a low thermal expansion coefficient typically of between 16 μm/m·K and 17 μm/m·K (generally made of copper mixed with ceramic alumina particles), and the sleeve 17, of high thermal conductivity, typically of between 17.5 μm/m·K and 18 μm/m·K (generally made of copper).

The coaxial exterior element or sleeve 17 is implemented in the form of an empty and flexible exterior structure which accompanies the thermal expansion of the coaxial interior element or internal cavity 13, reducing the mechanical stresses that may be induced in the structure.

Typically, for a part of the wall 12 of the internal cavity 13 comprising the grooves 15 with a thickness of between 0.1 and 1 mm, the thickness of the second part 18b of the flexible portion 18 would typically be between 0.3 and 3 mm, as illustrated in FIG. 8.

The ratios of thickness between the end first part 18a, second part 18b, and part 17c allow the wall 12 of the internal cavity 13 to expand without significant mechanical stress but rather with stress comparable to the thermal stress, thanks to the particularly flexible portion 18, which allows the sleeve 17 to enlarge with an increase in its diameter under the effect of the thermal expansion of the wall 12 of the internal cavity 13. Thus, the level of mechanical stress at the interface between the wall 12 and the flexible portion 18 is less than or equal to the thermal stress that would be applied at the external surface of the wall 12 if the flexible portion 18 were not present, or if there were Raschig rings in its place.

Furthermore, the particularly flexible portion 18 of the sleeve 17 can enlarge with an increase in its diameter under the effect of the flowrate of the water passing through the mini-canals 19. The particularly flexible portion 18 of the sleeve 17 may also constrict, with a reduction in its diameter, under the effect of the water stream.

The term "flexible" is used here to characterize the ability of the sleeve to exhibit these two characteristics mentioned hereinabove.

A heat-transport fluid distributor 22 comprises an injection 26 of heat-transport fluid and a jacket 23 positioned on the outside of the external jacket 11 to form a heat-transport fluid chamber 24 positioned above a number of inlets 25 into the external jacket 11 opening onto the space between the external jacket 11 and the sleeve 17.

The sleeve 17 also acts as a fluid distributor to make the velocity of the heat-transport fluid more homogeneous.

The mini-canals 19 may comprise at least one curve. Such a curve allows a mini-canal 19 to approach the heated wall 12 more closely and, where applicable, overcome the brazed joint if spots of braze material are present at the ends of the cavity. A curved mini-canal 19 (more deeply) reaches the material of the wall 12 of the internal cavity 13, allowing the stream of heat-transport fluid to be in direct contact with the part of the wall 12 closest to the internal cavity 13 that is heated the most. That makes it possible to improve the heat transfer only in the zones characterized by the thermal load spike, resulting in an axial temperature profile that is more homogeneous, thereby avoiding mechanical stresses.

Figure 10:
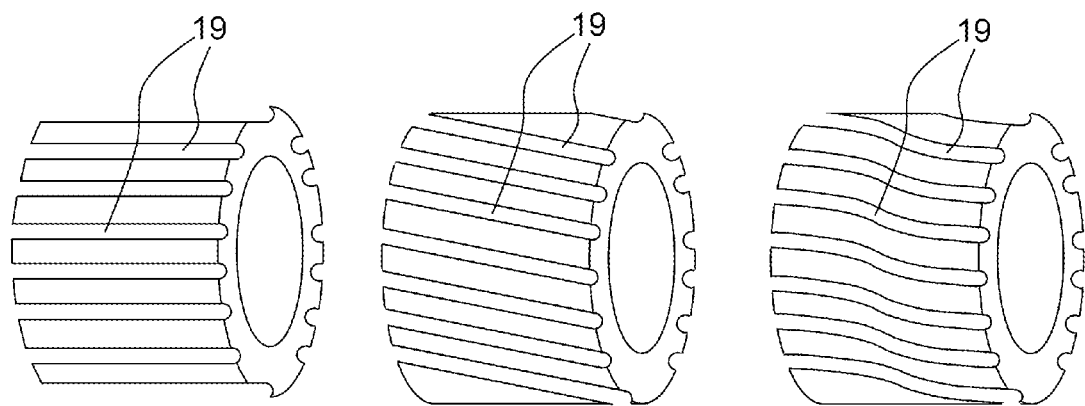
FIG. 10 schematically illustrates examples of the path of a mini-canal in a transverse plane, according to one aspect of the invention.

The path of a mini-canal 19 in a plane transverse to the direction of the heat-transport fluid (i.e. substantially transverse to the axis of the cavity when the cavity is cylindrical) may be rectilinear, inclined or dog-legged, as depicted in FIG. 10.

Figure 11:
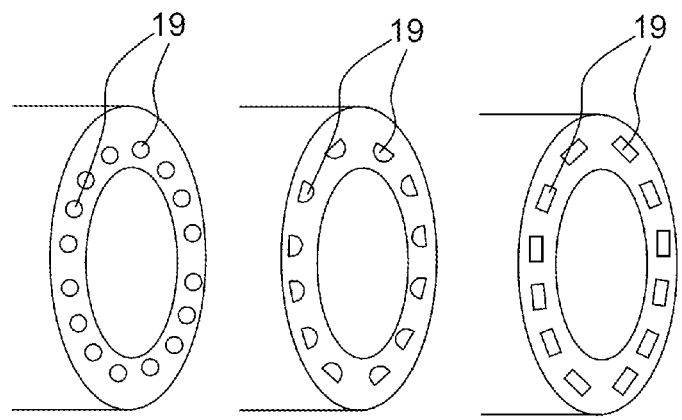
FIG. 11 schematically illustrates examples of the cross section of a mini-canal, according to one aspect of the invention.

The cross section of a mini-canal 19 may have absolutely any geometric shape, such as a circular, semi-circular, square or rectangular shape, with FIG. 11 illustrating a number of examples of this. A shape comprising an arch is preferred in order to exploit the offloading of force.

The cooling circuit 14 with mini-canals 19 may be embodied with any geometric arrangement (cylindrical, square, conical, etc.) of the wall 12 of the internal cavity 13 that is to be cooled.

The extendable flexible bellows 21 allows the wall 12 that is to be cooled to expand while eliminating the stresses that would have been applied by other connected elements.

The cooling circuit 14 is a dynamic system that evolves over the course of time: the cross section and the position of a mini-canal 19 vary during the heating process until a stable state is reached, thanks to the axial and radial elongation of the heated system. The dynamic movement of the system is temperature controlled.

Figure 12:
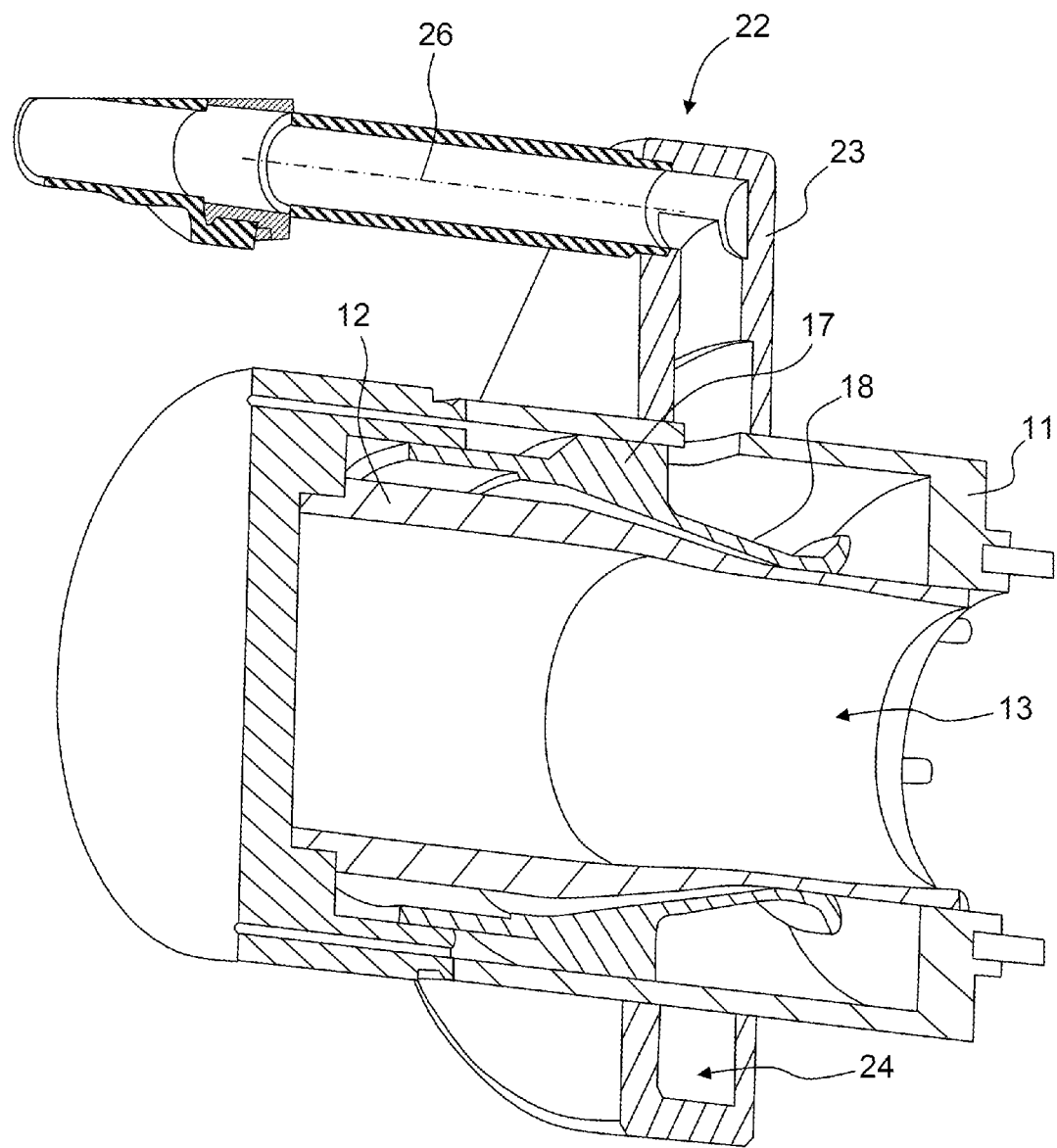
FIG. 12 schematically illustrates the presence of a heat-transport fluid distributor, according to one aspect of the invention.

FIG. 12 notably depicts one embodiment of the heat-transport fluid distributor 22, in an embodiment that does not include an extendable bellows 21.

The present invention allows the creation (using the brazed, welded or heat-shrunk-on bonding connection of various elements) of a cooling circuit 14 for which there is a low thermal resistance between the surface that is to be cooled of the wall 12 and the heat-transport fluid, while at the same time ensuring the mechanical stability and integrity of the materials so as to limit the deformations induced by thermal expansion while at the same time keeping control of the mechanical and thermal stresses.

The present invention improves the thermal management by means of an optimized cross section and optimized position of the mini-canals 19.

The transfer of heat is maximized by minimizing the distance between the heat-transport fluid and the heated interior wall 12 while at the same time providing a margin of safety for vacuumtightness. This distance can be minimized down to the thickness limited by the vacuumtightness tv.

The heat transfer is improved and allows an appreciable reduction in the temperature with a corresponding limitation of the thermal stress.

The stream of heat-transport fluid is in direct contact with the element that is to be cooled (the wall 12) without any intermediate elements or any braze/weld alloys.

The cross section of the canal in the direction of flow of the heat-transport fluid can be curved so as to get as close as possible depthwise to the heated wall 12 that is to be cooled.

For a gyrotron cavity, the cooling can be implemented with a minimum thickness ranging from 0.1 to 1 mm beneath a mini-canal, a number of canals varying from 50 to 200 units, the cross section of a mini-canal being made up of two zones: a zone of semi-circular cross section with a diameter ranging approximately from 0.1 to 1 mm and a zone of rectangular cross section with side lengths ranging from approximately 0.1 to 1 mm.

For example, for the cavity of a 100 GHz to 200 GHz gyrotron, the cooling may be implemented using a minimum thickness ranging from 0.8 to 1 mm under a mini-canal, a number of canals varying from 50 to 90 units, the cross section of a mini-canal being made up of two zones: a zone of semi-circular cross section with a diameter of approximately 1 mm and a zone of rectangular cross section with sides of approximately 0.5 and 0.7 mm, the radial spacing between the canals being similar to the radial width of the canals.

The present invention improves the management of thermal expansion and stresses.

Such a system limits the thermal expansion by means of the internal jacket 11 applying to the wall 12 of the coaxial internal cavity 13 mechanical stresses that are moderate (in comparison with the mini-canals circuits of the prior art).

The inlet to a mini-canal 19, where maximum convective heat transfer is observed, is situated as close as possible to the thermal load spike. This allows the temperature spike on the heated surface to be minimized and makes it possible to obtain a "flatter" temperature profile, leading to lower thermal stresses.

The possibility for the materials not to expand makes it possible not to create high mechanical stresses. The stress level is kept at the same level as the actual cavities of the Raschig rings while at the same time considerably improving the heat transfer.

Figure 13:
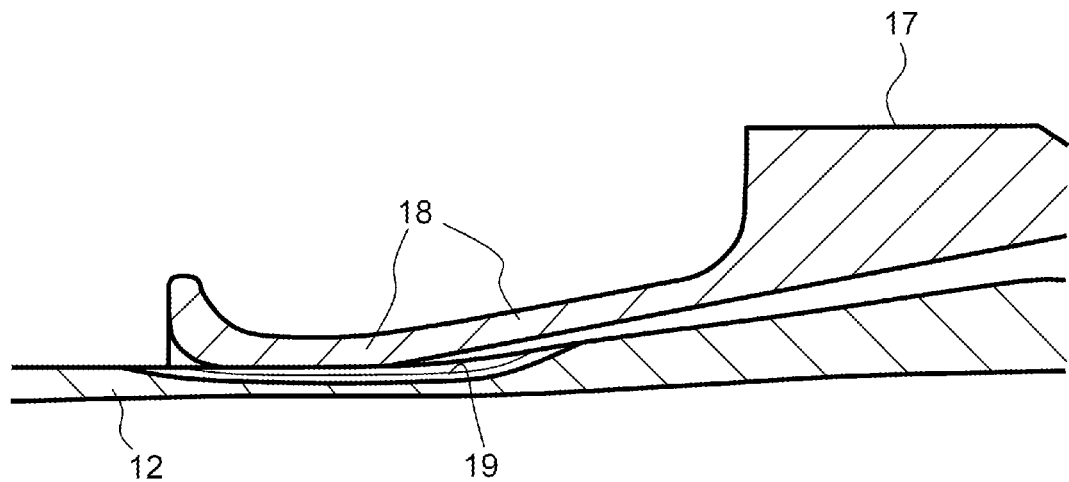
FIG. 13 schematically illustrates the detail of a mini-canal, according to one aspect of the invention.

The coaxial exterior element is produced in the form of a hollow and flexible structure referred to as a sleeve 17 which applies moderate mechanical stress to the coaxial interior element, the wall 12 of the internal cavity 13 as it expands under the effect of heat, as illustrated in FIG. 13.

Figure 14:
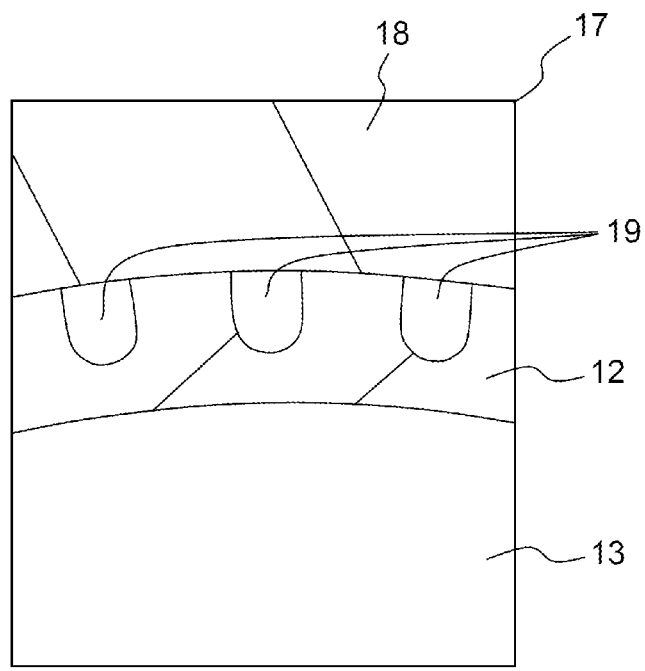
FIG. 14 schematically illustrates the cross section of a mini-canal, according to one aspect of the invention.

The cross section of a mini-canal 19 may contain an arched element in order to exploit the force unloading principle typical of an arch. A thicker wall alternating with the mini-canals 19 provides mechanical stability, as illustrated in FIG. 14.

Figure 15:
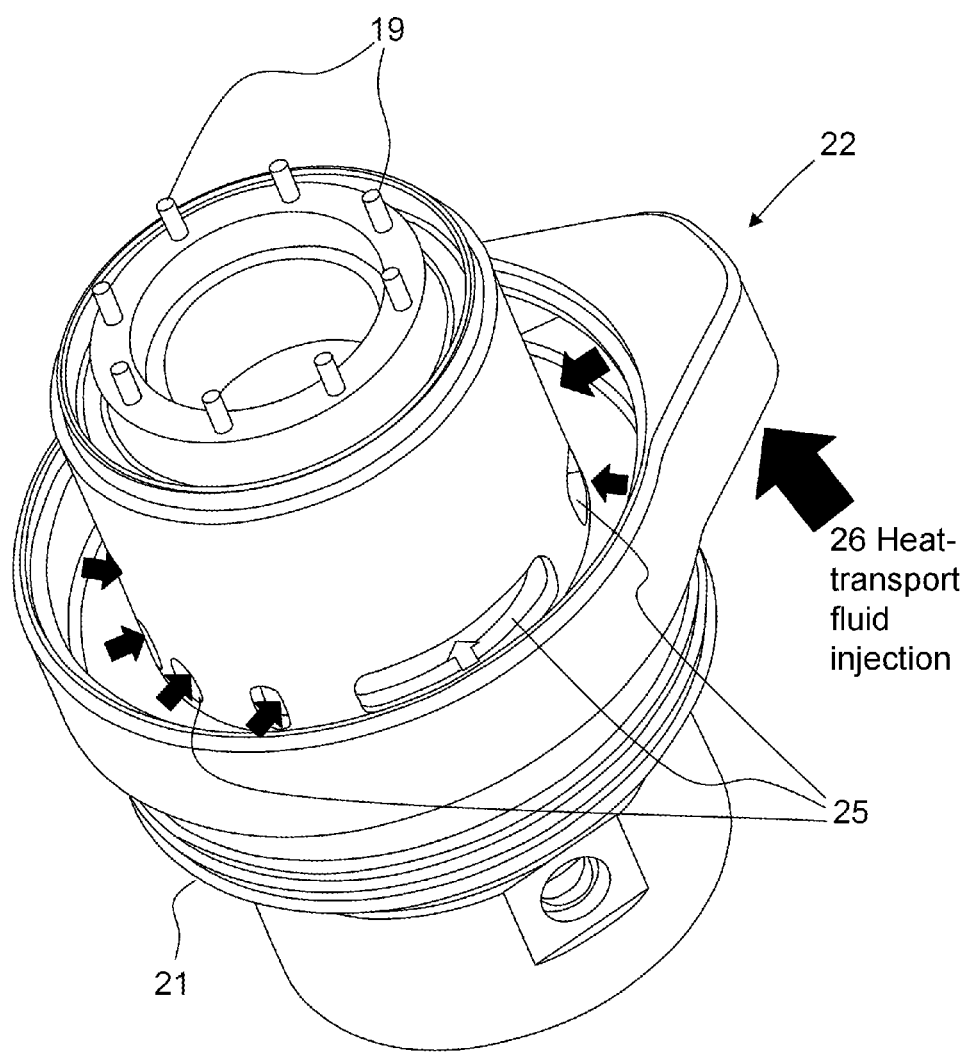
FIG. 15 schematically illustrates one exemplary embodiment of a heat-transport fluid distributor, according to one aspect of the invention.
Figure 16:
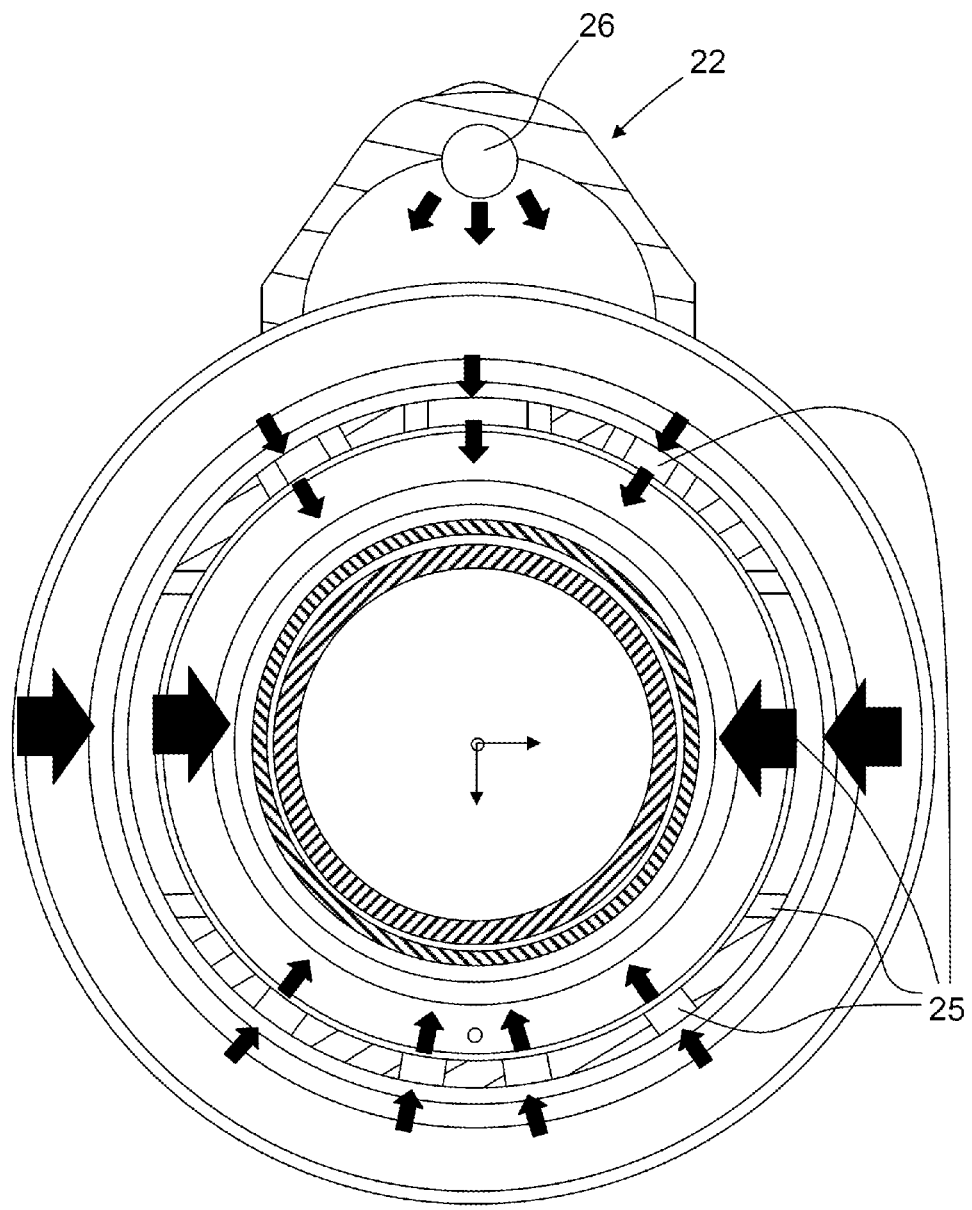
FIG. 16 schematically illustrates a view in cross section of the distributor of FIG. 15, according to one aspect of the invention.
Figure 17:
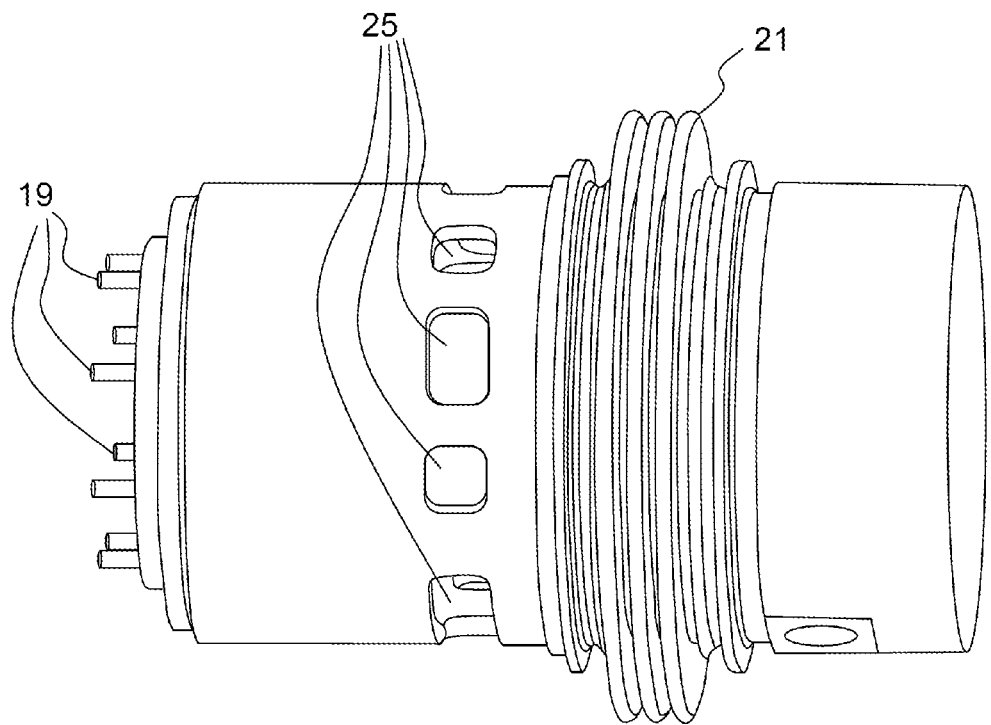
FIG. 17 schematically illustrates a view of the inside of the distributor of FIG. 15, according to one aspect of the invention.

The present invention improves the thermal homogeneity and limits appreciable anisotropic deformations by means of a homogenizer implemented by means of a two-stage heat-transport fluid distributor 22. One exemplary embodiment of the distributor 22 is depicted in detail in FIG. 15, FIG. 16 and FIG. 17.

A heat-transport fluid feed is arranged around the external jacket 11: narrow inlets 25 or holes are placed near the injection 26 of the heat-transport fluid, and larger holes are placed further away from the injection of the heat-transport fluid while other holes of a middling size are placed in the side opposite to the injection (where the two components of the radial velocity which separate near to the injection meet up again). The distributor 22 acts like a collection of multiple inlets 25 in which the velocity of the heat-transport fluid is constant for different positions and at different distances from the fluid injection point 26. As a result, the axial velocity of the heat-transport fluid is constant in the azimuthal direction.

The secondary distribution chamber 24 is created by the sleeve 17 to finally homogenize the velocity of the heat-transport fluid in the direction of entering the mini-canals 19, as illustrated in FIG. 9. As the heat-transport fluid arrives on the wall of the sleeve 17 with a homogeneous radial velocity impact, the heat-transport fluid is deflected toward the inlets of the mini-canals 19.

Figure 18:
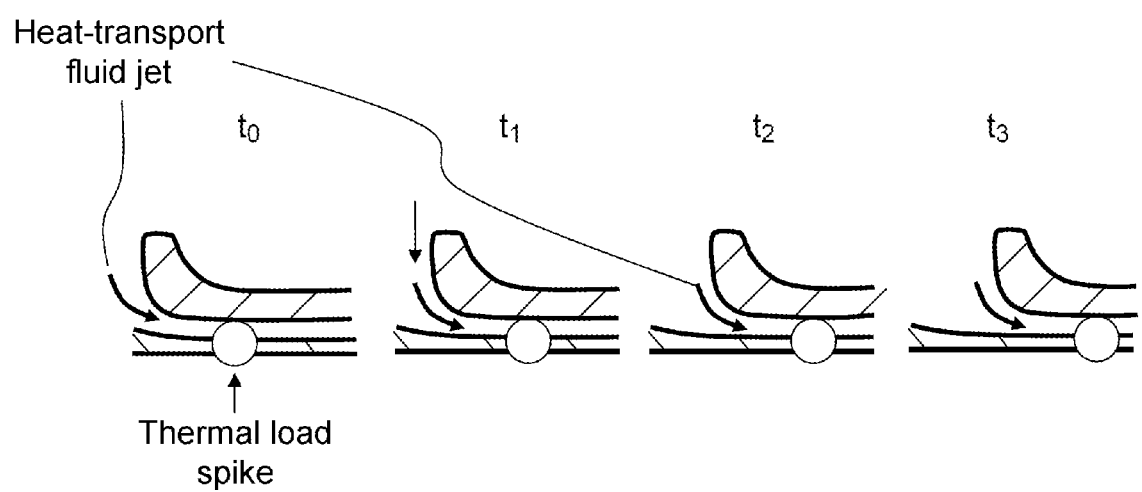
FIG. 18 schematically illustrates the evolution of the thermal load spike, according to one aspect of the invention.
Figure 19:
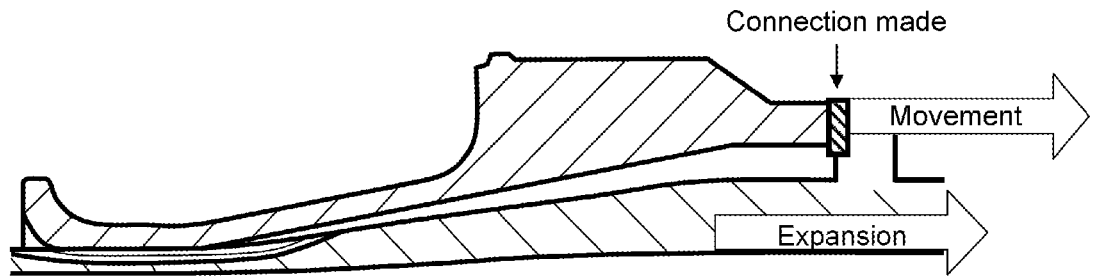
FIG. 19 schematically illustrates the longitudinal effects of the thermal load, according to one aspect of the invention.

An inlet of a mini-canal 19 is situated close to the thermal load spike, in order to exploit the high heat-transfer coefficient caused by the high velocity of the heat-transport fluid. Before a state of equilibrium is reached, the position of the thermal load spike moves to the right, as illustrated in FIG. 18 and FIG. 19 along the axial coordinate as a result of the thermal deformations of the internal surface. The invention proposed addresses this problem by creating the cooling circuit as a dynamic system that evolves over the course of time and the geometry of which changes as it heats up and cools down: the heat transfer (as well as the velocity of the heat-transport fluid and the pressure drop) is temperature controlled.

The axial position of the coaxial jacket of the heat-transport fluid distributor 22 is controlled by the temperature of the cavity 13 (via the axial thermal expansion thereof): it follows the position of the pressure spike as the heating transient conditions evolve, until a stable position is reached.

To this end, axial movement corresponding to the axial thermal expansion of the coaxial internal element (cavity 13) is applied to the coaxial external element (the jacket of the heat-transport fluid distributor 22).

The coaxial external element (the jacket of the heat-transport fluid distributor 22) is connected to the free section of the cavity 13. Under steady state conditions, the thermal load spike moves towards a certain position (in gyrotrons, towards the upward cone). The invention allows the jets of heat-transport fluid to be aimed as close as possible to the thermal load spike while the cavity 13 is heating up. The thermal expansion of the cavity 13 is used to move the sleeve 17: the position of the heat-transport fluid inlet where the fluid enters a mini-canal 19 is controlled by the thermal expansion of the cavity 13: as the cavity 13 expands, the sleeve 17 moves, making the inlet of the mini-canal 19 follow the evolution in the position of the thermal load spike.

Figure 20:
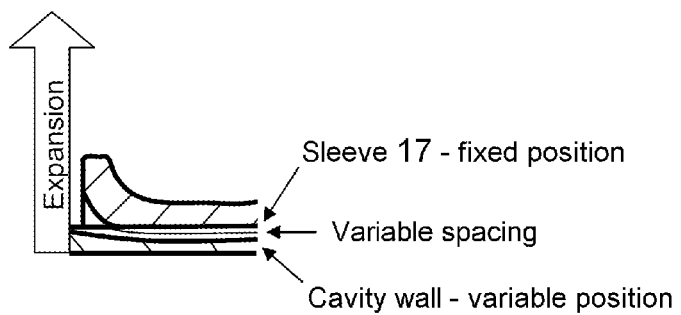
FIG. 20 schematically illustrates the transverse effects of the thermal load, according to one aspect of the invention.
Figure 21:
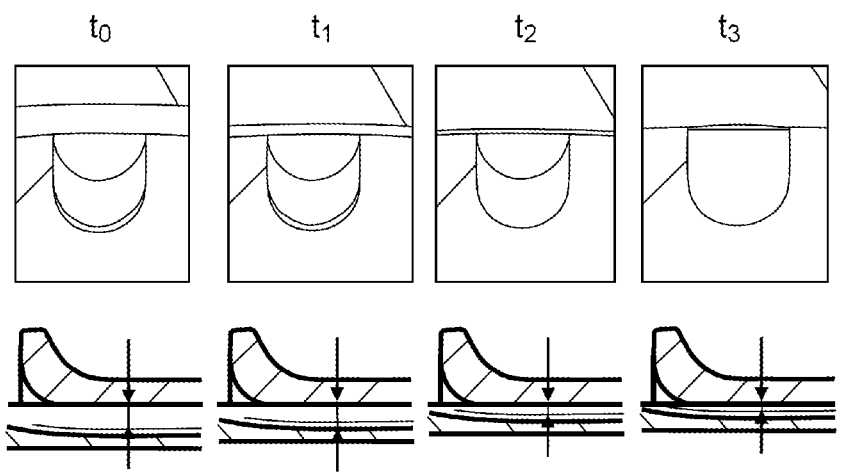
FIG. 21 schematically illustrates the transverse effects of the thermal load, according to one aspect of the invention.

As depicted in FIG. 20 and FIG. 21, the cross section of the mini-canals 19 is temperature controlled: a space is left between the exterior wall 12 of the cavity 13 (groove) and the interior wall of the sleeve 17, which is kept cold, and so there is a bypass when the heating begins and the bypass is progressively diminished in size until the steady state is achieved when the cross section of the mini-canals 19 reaches its nominal shape. At the start of the transient heating of the cavity 13, there is a bypass route between the cavity and the sleeve 17, hence the opening of the mini-canals. As the cavity 13 expands radially, the mini-canals 19 are activated. In the steady state, the mini-canals 19 reach their final cross section.

A third level of fluid distribution, similar to the primary one, may be situated at the outlet around the shaft: narrow holes are positioned close to the fluid extraction and larger holes are positioned further away. The structure results in a set of multiple outlets. The effect is to increase the azimuthal homogeneity of the distribution of the pressure at the outlet. This leads to better azimuthal distribution of the velocity of the fluid in the canals and therefore more homogeneous azimuthal distribution of the temperature, as demonstrated by numerical calculations based on the geometry of the Thales TH1507U Gyrotron.

Figure 22:
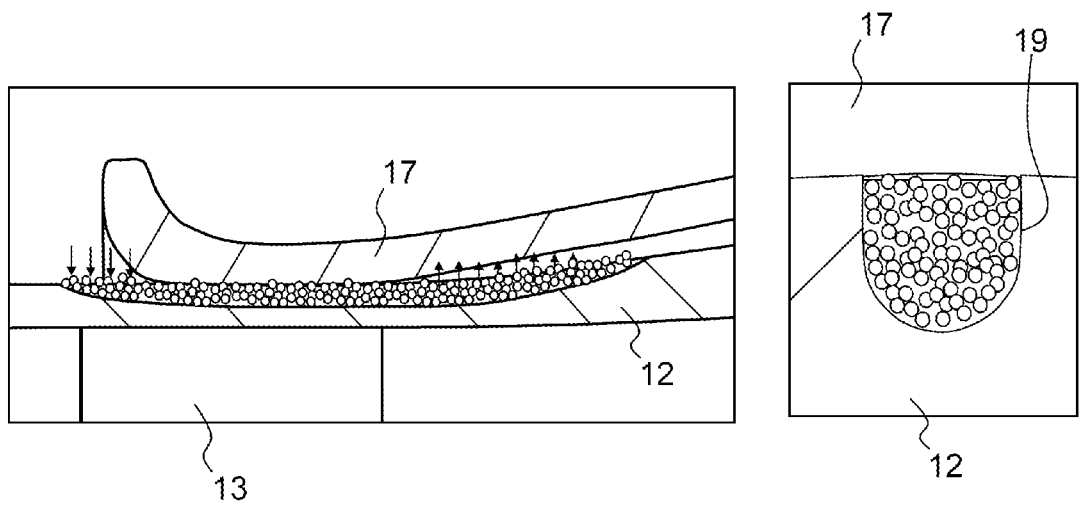
FIG. 22 schematically illustrates the presence of porous media in the mini-canals, according to one aspect of the invention.
Figure 23:
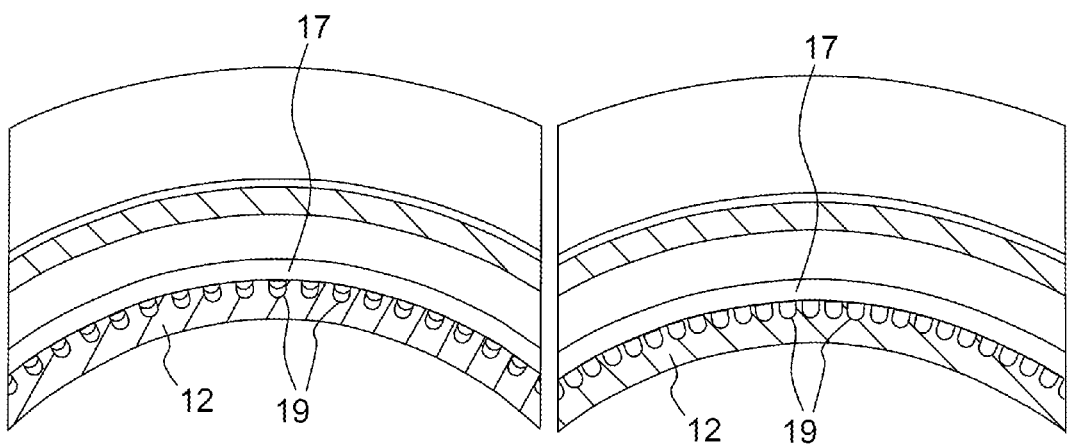
FIG. 23 schematically illustrates the difference between the embodiments with and without the presence of porous media in the mini-canals, according to one aspect of the invention.

As a variant, as illustrated in FIG. 22 and FIG. 23, it is possible to exploit the advantages of the principle of a porous media heat exchanger.

In order to improve the exchange of heat, the mini-canals 19 may include the presence of porous media arranged inside the mini-canals 19. The effects of this configuration are chiefly that of increasing the surface area available for heat exchange, that of reducing the laminar sublayer near the wall, and that of promoting the mixing of the fluids. Once the mini-canal 19 has been machined, the foam from which the media is made may be deposited in the mini-canal 19. After solidification, the coaxial interior element can be remachined to fit the outside diameter.

Because of the presence of the porous media in a mini-canal 19, the number of mini-canals 19 can be increased in relation to the solution in which the mini-canals 19 are empty, and the spacing between the mini-canals can be decreased to 1/10 of the radial spacing of the mini-canals. This is possible because the presence of the porous media introduces a certain mechanical robustness.

Compared with a traditional porous media heat exchanger, this solution offers improved mechanical stability, incorporates the two-stage fluid distributor and exploits the temperature-controlled dynamic evolution of geometry over time.

Figure 24:
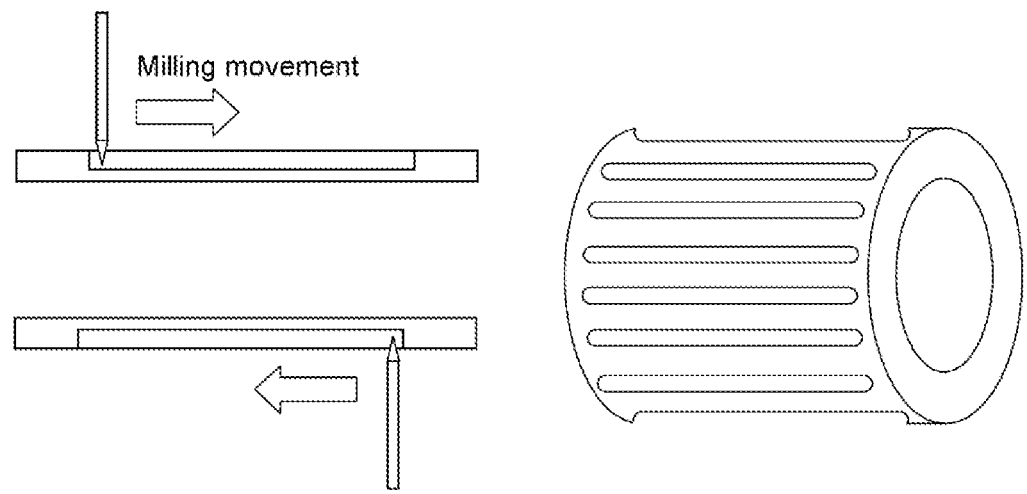
FIG. 24 schematically illustrates one embodiment of a system, according to one aspect of the invention.
Figure 25:
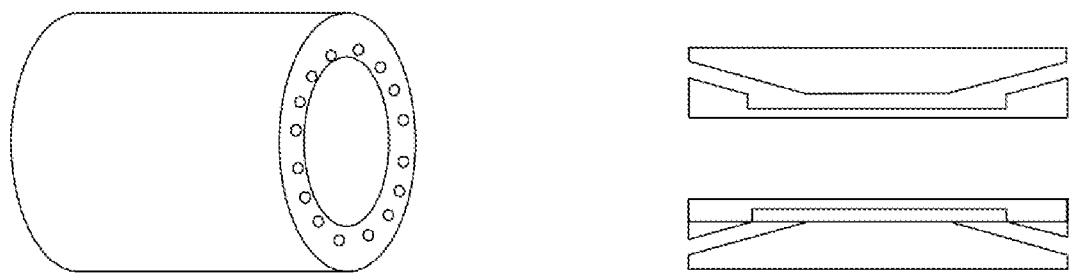
FIG. 25 schematically illustrates one embodiment of a system, according to one aspect of the invention.

As depicted in FIG. 24 and FIG. 25, the present invention can be achieved by milling, and joining together by brazing, welding or heat-shrink bonding, two elements, or by copper electroforming or by 3D additive manufacture of a second element on a first element.

The machining process is relatively simple and conforms to the manufacturing procedures of the prior art.

FIG. 24 is a simplified depiction of the method of production using milling/brazing, in which method the coaxial interior element is machined to bore the rear face of the canals and, as illustrated in FIG. 25, the coaxial exterior element is inserted and then brazed, welded or bonded far away from the mini-canals.

It is also possible to use a method involving copper electroforming: the profiles of the mini-canals 19 on the coaxial interior element are bored using traditional machining procedures, the profiles of the extremities of the mini-canals 19 which are shared with the exterior material are produced by depositing lost wax: a suitable quantity of wax is applied and tailored using traditional boring procedures in order to obtain the negative mould of the canals, the coaxial exterior element is produced by copper electroforming, the wax being removed by a thermal process, and finally the profile of the coaxial exterior element is adjusted to suit using traditional boring methods.

The same method can be obtained by additive manufacturing of the exterior element provided that the materials generated by additive manufacturing meet the requirements of thermal conductivity, surface roughness, elastic limit and breaking stress demanded by the application considered (the application most concerned is the gyrotron).

This solution can be applied to all electron tubes and electronic devices and to devices involving semiconductors or passive elements that need to be cooled.

Any geometric arrangement of the element that is to be cooled may benefit from the proposed invention: geometries such as cylindrical, square or conical as well as frustoconical may be subject to the application of the cooling circuit involving mini-canals.

The cooling of the cavities of a gyrotron is one particularly advantageous application of the proposed invention.

The invention claimed is:

1. An electronic system comprising:
   an external jacket;
   a wall of an internal cavity that is to be cooled;
   at least one fixed connection fixing the external wall of the internal cavity that is to be cooled to the external jacket;
   a heat-transport fluid cooling circuit comprising grooves on the external surface of the wall of the internal cavity and a sleeve comprising a flexible portion positioned flush with the external surface of the external wall of the internal cavity, thereby forming mini-canals with said grooves, having a non-zero longitudinal component, the flexible portion comprising an end first part of a first thickness greater than a second thickness of a contiguous second part of the flexible portion, the second part being contiguous with a third part of the sleeve which has a third thickness greater than the first and second thicknesses, and in contact with a jacket positioned on the outside of the external jacket;
   at least one radial extension of the wall of the internal cavity creating connecting points configured to hold the sleeve in place; and
   a space between the external wall of the internal cavity and the sleeve at the flexible portion of the sleeve.

2. The electronic system according to claim 1, wherein the first thickness is at least twice as great as the second thickness, and the third thickness is at least twice as great as the second thickness.

3. The electronic system according to claim 1, comprising at least three connecting points for connecting, in terms of longitudinal translation, the sleeve and the wall of the internal cavity.

4. The electronic system according to claim 3, wherein a connecting point comprises a brazed and/or welded and/or heat-shrunk connection.

5. The electronic system according to claim 1, comprising an extendable bellows in the external jacket.

6. The electronic system according to claim 1, comprising at least one inlet of the cooling circuit in the external jacket opening onto the space between the external jacket and the sleeve, so that the path of a heat-transport fluid from said inlet to the mini-canals is maximized.

7. The electronic system according to claim 1, wherein a mini-canal is rectilinear or curved.

8. The electronic system according to claim 1, wherein a mini-canal has a circular, semi-circular or rectangular cross section.

9. The electronic system according to claim 4, comprising a heat-transport fluid distributor comprising the jacket positioned on the outside of the external jacket to form a heat-transport fluid chamber positioned above a number of inlets into the external jacket opening onto the space between the external jacket and the sleeve.

10. The electronic system according to claim 9, wherein said inlets of the heat-transport fluid distributor are arranged in a circle on the external jacket.

11. The electronic system according to claim 10, wherein the inlets are of rectangular and/or circular and/or square and/or semi-circular shape.

12. The electronic system according to claim 1, wherein a groove forming a mini-canal contains a porous medium.

13. The electronic system according to claim 1, wherein the external jacket comprises layers of ceramic-based or metal-based porous material.

14. The electronic system according to claim 1, wherein the wall of the internal cavity contains copper mixed with ceramic alumina particles.

15. The electronic system according to claim 1, wherein the sleeve contains copper or copper mixed with ceramic alumina particles.

16. The electronic system according to claim 1, being a resonant cavity, an electron vacuum tube or a gyrotron.

* * * * *

UNITED STATES PATENT AND TRADEMARK OFFICE
CERTIFICATE OF CORRECTION

PATENT NO. : 11,871,504 B2
APPLICATION NO. : 17/954136
DATED : January 9, 2024
INVENTOR(S) : Alberto Leggieri et al.

Page 1 of 1

It is certified that error appears in the above-identified patent and that said Letters Patent is hereby corrected as shown below:

On the Title Page

Column 1 In Foreign Application Priority Data Item (30) please add:
October 14, 2021 (FR) 2110917

Signed and Sealed this
Twenty-seventh Day of August, 2024

Katherine Kelly Vidal
*Director of the United States Patent and Trademark Office*